Sept. 18, 1951 M. L. JEFFREY 2,568,638
POSITIVE CLUTCH MECHANISM
Original Filed July 1, 1944
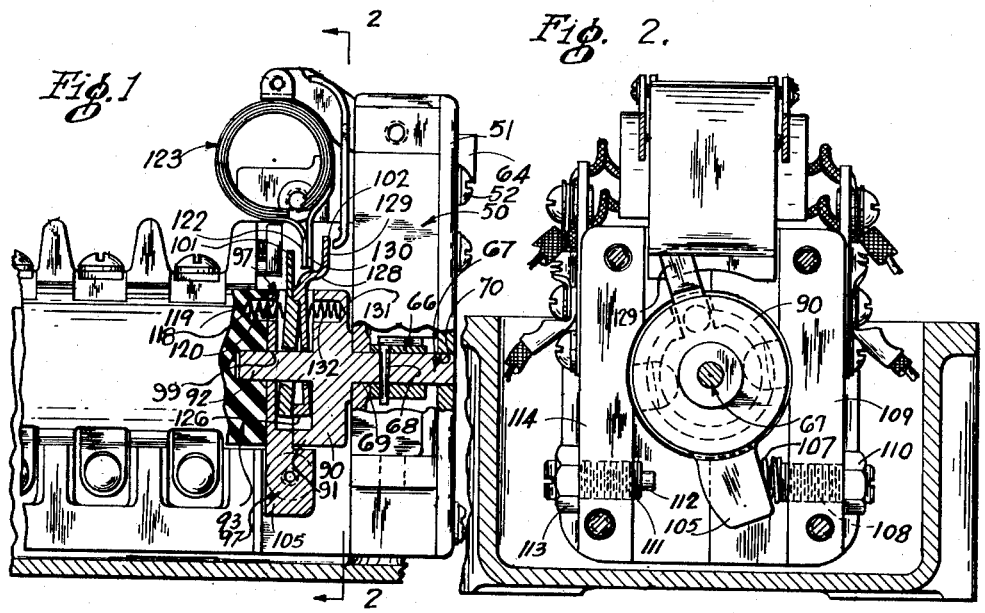
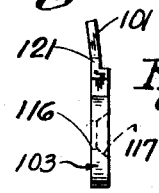
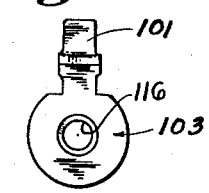
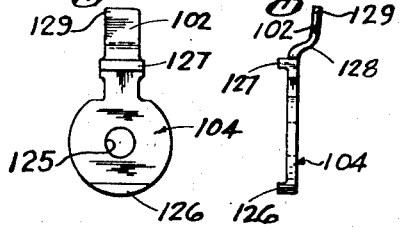
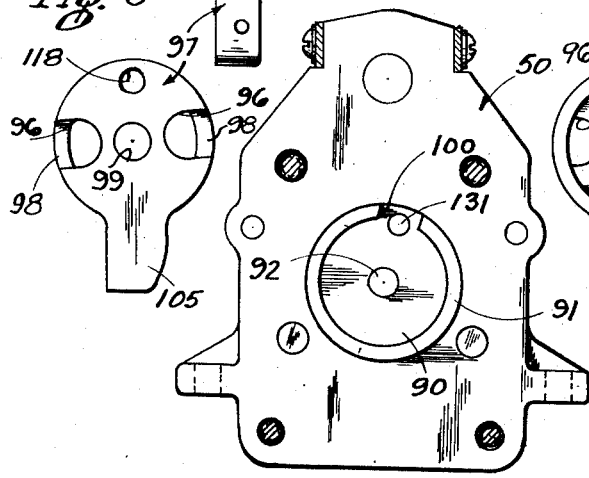
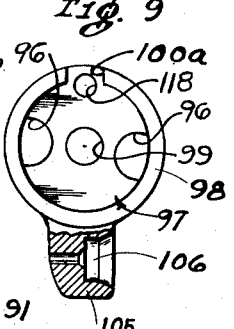
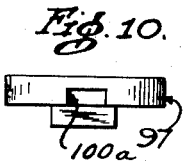
Inventor
Max Leroy Jeffrey
By J. W. Douglass
His Attorney Patented Sept. 18, 1951

2,568,638

UNITED STATES PATENT OFFICE 2,568,638

POSITIVE CLUTCH MECHANISM

Max Leroy Jeffrey, Shaker Heights, Ohio, assignor to The National Acme Company, Cleveland, Ohio, a corporation of Ohio Original application July 1, 1944, Serial No. 543,114. Divided and this application May 10, 1947, Serial No. 747,348

7 Claims. (Cl. 192—67)

This invention relates to switches and more particularly to a multi-pole switch having a quick make and break and also having provisions for opening the circuit upon an overload thereof. It is a division of my application, Ser. No. 543,114, filed July 1, 1944, now Patent No. 2,542,530.

One of the objects of my invention is to provide an improved clutch device especially adapted for use in electrical switches.

Another object of my invention is to provide a clutch for a switch particularly adapted to be opened by an overload on the switch.

Another object of my invention is to provide an improved overload releasing device.

Another object of my invention is to provide an improved thermostatically operated overload device.

Other objects of the invention reside in economies in manufacture and the organization and arrangement of the parts such that adjustments, repairs and replacements may quickly and easily be made without the need of special tools or equipment.

Still other objects of the invention and the invention itself will become more apparent from the following description of an embodiment thereof and which description is illustrated by the accompanying drawings and forms a part of this specification.

In the drawings:

Fig. 1 is a fragmentary view, through the center of a switch with certain parts shown in elevation and with other parts broken away and shown in section, and particularly illustrates the clutch mechanism;

Fig. 2 is a vertical section taken from a plane indicated by the line 2—2 of Fig. 1;

Fig. 3 is a rear elevational view of the snap mechanism housing assembly;

Fig. 4 is a side elevational view of one of the clutch levers;

Fig. 5 is a front view thereof;

Fig. 6 is a side elevational view of a clutch lever which cooperates with that of Fig. 4;

Fig. 7 is a rear view thereof;

Fig. 8 is a view of the contactor drum operating lever taken from the side which is disposed adjacent the end of the contactor drum;

Fig. 9 is an opposite face view thereof with a portion broken away and shown in section;

Fig. 10 is a top plan view thereof;

Fig. 11 is a side elevational view thereof;

Referring now to the drawings, throughout which like parts have been designated by like reference characters, and more particularly to Figs. 1-3, I have illustrated my invention in conjunction with a switch having a snap action. The details of the structure of the switch and the snap action are more fully described in my aforesaid application, Ser. No. 543,114, filed July 1, 1944, now Patent No. 2,542,530, issued February 20, 1951, of which this is a division. The snap action is enclosed in a housing 50 closed at the front by a cover plate 51 held thereon by screws 52. The rock lever 66 which is driven by the snap action is pinned to a shaft 67 by a tapered pin 68. The shaft 67 is journalled on one end in the bearing 69 in the rear wall of the housing 50, and at its other end in the bearing 70 the cover plate 51.

Behind the bearing 70, the shaft 67 carries one part of the clutch mechanism. As best shown in Figs. 1-3, this element constitutes a cup which has a circular body 90 provided with a peripheral flange 91 and a co-axial stem or stub 92 which extends in alignment with the shaft 67. This shaft provides a support for the clutch parts as well as supporting one end of the rotating contact carrying drum 93 of the switch which the clutch is adapted to turn.

The end of the drum adjacent the clutch is provided with a pair of lugs, disposed diametrically opposite each other and adapted to engage in recesses 96 in a driven clutch member 97, Figs. 8-11, inclusive.

The driven clutch member includes a circular body having a peripheral flange 98; a central opening 99 being provided through which the stem 92 on the cup body 90 of the other clutch member extends, the driven clutch member being thus supported and the flanges 91 and 98 on the two bodies extending toward each other to provide a chamber or recess therebetween, Fig. 1. The driving clutch flange 91 is provided with a slot 100 and the driven clutch member likewise with a slot 100a, which slots are normally in alignment with each other and provide a space through which the tongues 101 and 102 of intermediate clutch levers 103 and 104 may extend.

The driven clutch member 97 is provided with a downwardly extending lug 105 which has a socket 106 formed therein, as best shown in Fig. 9. This socket receives one end of a spring 107 (Fig. 2) the other end of which is adjustably carried by a screw support 108 extended in the wall of the fixed contact carrying support 109 and which may be locked in any desired adjusted position by a lock nut 110. The spring 107 tends to rotate the drum 93, through the member 97 in a direction to normally open the contacts. A stop, which comprises a screw member 111 having a projection 112 for engagement with the lug 105 is provided, being screw-threaded through the opposite fixed contact carrying member wall 114. The stop may be locked in any desired position by the lock nut 113. This stop limits the amount of movement of the member 97 and hence the drum 93. It will be apparent from the foregoing that the driving and driven clutch members are supported in juxtaposed positions to each other. The driving connection therebetween is effected by the intermediate members 103 and 104.

The intermediate clutch member 103 includes a circular body of slightly less diameter than that of the recess formed by the fingers 91 and 98 of the driving and driven clutch members and is provided with a central opening 116 which tapers outwardly at 117. The member is disposed on the stem 92 in the recess between the driving and driven clutch members and because of the tapered opening may tilt therein as can best be seen in Fig. 1. The tongue 101 of the member 103, as previously stated, extends upward through the openings 100—100a in the flanges 91—98. The driven clutch member 97 is provided with an aperture 118 which extends through the wall, spaced from the edge and opposite the opening 100a. The drum 93 is provided with a recess 119 in alignment with the aperture 118 and a spring 120 is disposed in the recess and extends out through the aperture 118 and into engagement with the tongue 101 of the member 103 and causes the intermediate clutch lever to be tilted on the stub shaft 92 as shown in Fig. 1. The tongue 101 is bent slightly at 121 and extends upward opposite the end 122 of the thermostat element 123, the bend 121 permits the tongue to be in parallelism with the thermostat even though the intermediate clutch member is tilted.

The other intermediate clutch member 104 constitutes a circular body which is thinner than the other intermediate clutch member 103. It is also provided with the central opening 125 which is large enough to allow this member also to be tilted, it being supported in like manner on the stem 92 in the recess formed by the driving and driven members. The lower end of the body is provided with a lug 126 which extends toward and is adapted to be in engagement with the body of the member 103. This lug acts as a fulcrum or pivot for the member as will hereinafter more clearly appear. The stem 102 also extends upward from the body of this member 104, through the slots 100—100a in the driving and driven clutch member flanges. The stem is provided with a lug 127 which extends toward the other member 103 and is adapted to seat against the stem 101 of the other member. Above the lug 127 the stem is bent outward at 128 in a substantially S-shaped curve and terminates in a straight upstanding portion 129 opposite to the other end member or leg 130 of the thermostat element 123. The cup member 90 is provided with a recess 131 that carries a spring 132 which bears against the intermediate member 104 tilting it on the stem 92 in a like manner as described for the other intermediate member. Thus the two clutch members are held in engagement with each other. The member 103, because of the thicker body, and the member 104 because of the lug 127, cross the meeting edges of the flanges of the driving or driven members between the flanges 91—98.

It will thus be seen that in the position shown, the drive from the driving member 90 to the driven member 87 is effected by the tongues 101—102 of the intermediate clutch members 103—104 at the openings 100—100a in the flanges of the driving or driven members. As long as the intermediate members remains tilted, as shown in Fig. 1, the drive connection will remain intact, that is, the lug 127 will be across the junction of the flanges 91—98. However, if an overload should occur, the operating legs 122 and 130 of the thermostatic member, which is bi-metallic in character, will move apart. The leg 130 will engage the tongue 102 at 129 and the leg 122 will engage the tongue 101 and the two intermediate clutch members 103—104 will be moved from their tilted position to a vertical position, the lug 126 on the member 104 acting as a fulcrum, and against the pressure of the springs 120—132. In this position the tongues on the intermediate member are no longer opposite the junction of the flanges 91—98 but are well within the confines of the respective slots 100 and 100a and the driving and driven members are free to operate independently. This action occurs when the switch contacts are in a closed position, this being the position shown in Fig. 2 where the spring 107 is compressed and exerting pressure against the lug 105 of the driven member 97. The current is utilized during overload to heat the thermostat 123, the clutch is released and the spring 107 rotates the drum 93 with its contacts to open position.

It is apparent, therefore, that a driving connection is established from the snap action to the drum of the switch. However, this connection is adapted to be separated by the action of a thermostatic device operable upon a condition of overload on the switch.

Having thus described my invention, I am aware that numerous and extensive departures may be made therefrom without departing from the spirit and scope of the invention.

I claim:

1. A mechanism of the class described including a driving and a driven member disposed in axially aligned relation and having coaxial flanges disposed in abutting relation to provide a chamber, an opening through each of said flanges, means interposed in said openings of said flanges comprising a pair of lever elements each including a body disposed in said chamber and tiltable axially therein and each having a tongue extending from said body through said opening at least one of which is adapted to cross the junction of said flanges when said openings in the respective flanges are in alignment, said tongues being tiltable into their respective openings to a position where the junction of the flange is no longer crossed thereby.

2. A mechanism of the class described including a driving and a driven member disposed in axially aligned relation and having coaxial flanges disposed in abutting relation to provide a chamber therebetween, each of said flanges formed to provide an opening therethrough, means disposed in said chamber and having parts extending through said openings in said flanges at least one of which crosses the point of abutment of said flanges when said openings are in alignment, and said means comprising a pair of lever elements each including a body disposed in said chamber and tiltable axially therein and each having a tongue extending from said body through said opening said axial tilting being effective to move said parts so that the point of abutment is no longer crossed thereby.

3. A mechanism of the class described including a driving and a driven member disposed in axially aligned relation and having coaxial flanges disposed in abutting relation to provide a chamber, an opening through each of said flanges, means interposed in said openings of said flanges comprising a pair of lever elements each including a body disposed in said chamber and tiltable axially therein and each having a tongue extending from said body through said openings at least one of which crosses the junction of said flange when said openings are in alignment, and spring means for normally holding at least one of said tongues opposite said junction point of said flanges.

4. A mechanism of the class described including a driving and a driven member disposed in axially aligned relation, said members being disposed in abutting relation and formed to provide a housing therebetween, an opening through the walls of each member of said housing, and means comprising a pair of elements each disposed in said housing and tiltable axially therein and at least one of said elements having a tongue extending from said element through said opening in at least one member, and spring means for normally holding said tongue positioned opposite said abutment point of the members when the openings in said members are in alignment.

5. A mechanism of the class described including a driving and a driven member disposed in axially aligned relation to each other, said members having coaxial flanges disposed in abutting relation to each other to provide a chamber therebetween, an opening through said flanges of each member, means interposed in said opening of said flanges comprising a pair of lever elements each comprising a body disposed in said chamber and tiltable axially therein and each having a tongue extending from said body through the opening in one of said flanges; and spring means for normally holding at least one of said tongues opposite said junction point of said flanges when said openings are in alignment, and means for engagement with said tongues to move either or both of them away from said junction and permit independent movement of the driving and driven members.

6. A mechanism of the class described including a driving and a driven member disposed in axially aligned relation, each member being formed with a coaxial flange, said flanges disposed on said members being disposed in abutting relation to each other to provide a chamber therebetween, each of said flanges being formed with an opening therein, means interposed in said openings in said flanges comprising a pair of elements each including a body disposed in and guided by said chamber and tiltable axially therein and each having an arm on said body extending through an opening in one of said flanges, and spring means for holding at least one of said tongues opposite the junction point of said flanges when said openings are in axial alignment, and thermostatically operated means for engagement with said tongues to move either or both of them away from said junction point and thereby permit independent movement of the driving and driven member.

7. In an apparatus of the class described including a drive member having a circular body, a flange extending from the body coaxial therewith and an axial stub shaft carried thereby, a driven member having a circular body journalled on said stub shaft, a flange on the body extending coaxial with the shaft and a lever extending radially from the body, said flanges extending into abuting relation with each other to provide a chamber therebetween and each formed with notches to provide an opening from said chamber, a pair of lever members each comprising a disc-like body disposed on said stub shaft and formed to permit tilting thereon, said lever members having arms extending through said opening, spring means for each arm engaging each arm to move said members into abutting relationship with each other, at least one of said lever members provided with a thickened portion opposite its arm adapted to bear against the other body to cause said bodies to be tilted in said chamber, at least one of said arms adapted to normally cross the junction point of said flanges at said opening when said notches are in axial alignment and prevent relative movement between said driving and driven members, and means disposed for engagement with said lever arms for moving said lever members apart, said members when forced apart adapted to lie within the confines of said flanges and out of alignment with said junction point to allow relative movement between the driving and driven members.

MAX LEROY JEFFREY.

REFERENCES CITED

The following references are of record in the file of this patent:

UNITED STATES PATENTS

| Number | Name | Date |
| --- | --- | --- |
| 673,353 | Allen | Apr. 30, 1901 |
| 1,142,787 | Landsiedel | June 8, 1915 |
| 1,921,264 | Sampson | Aug. 8, 1933 |
| 1,988,413 | Bing | Jan. 15, 1935 |
| 2,078,600 | Collins | Apr. 27, 1937 |